UNITED STATES PATENT OFFICE.

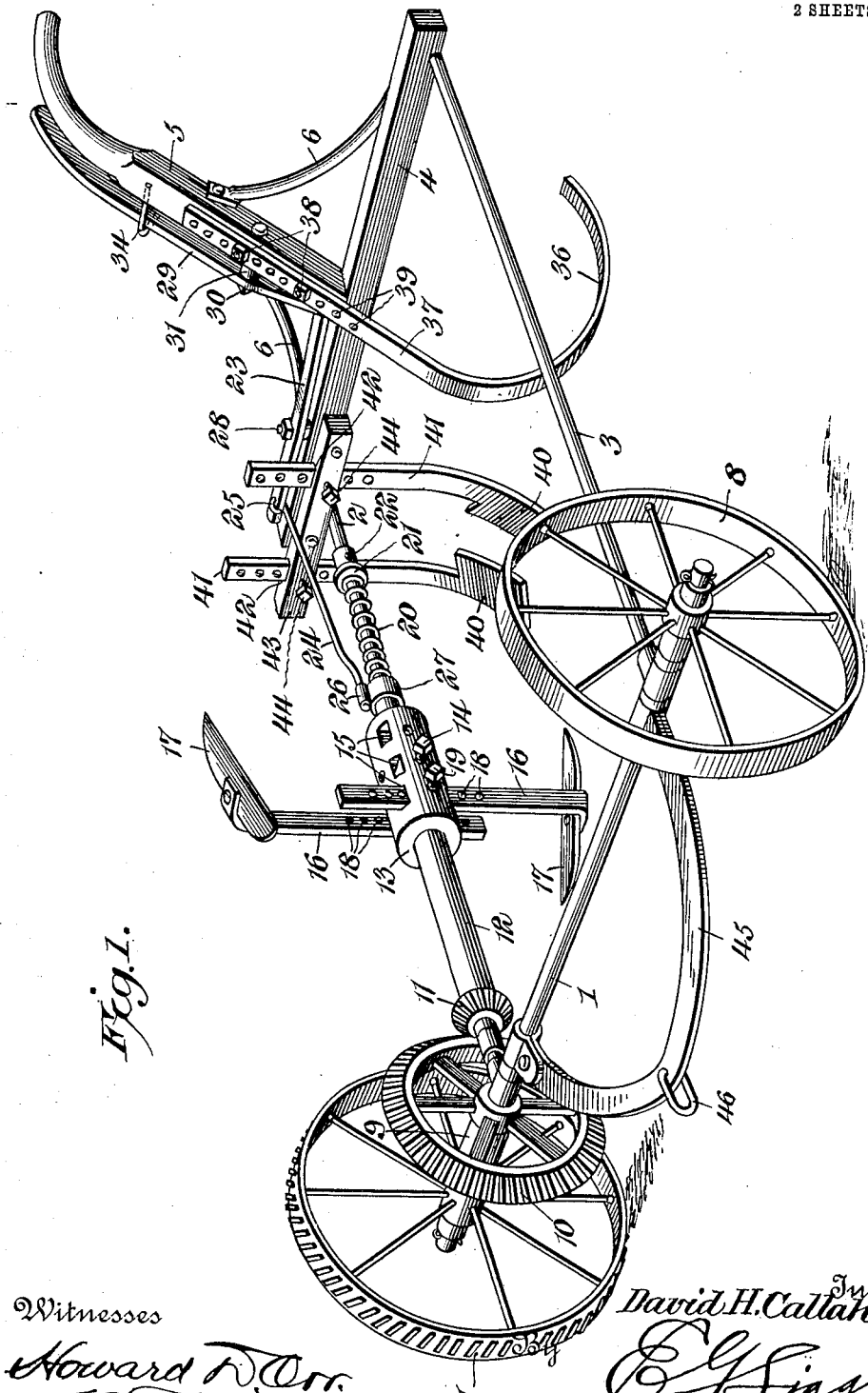

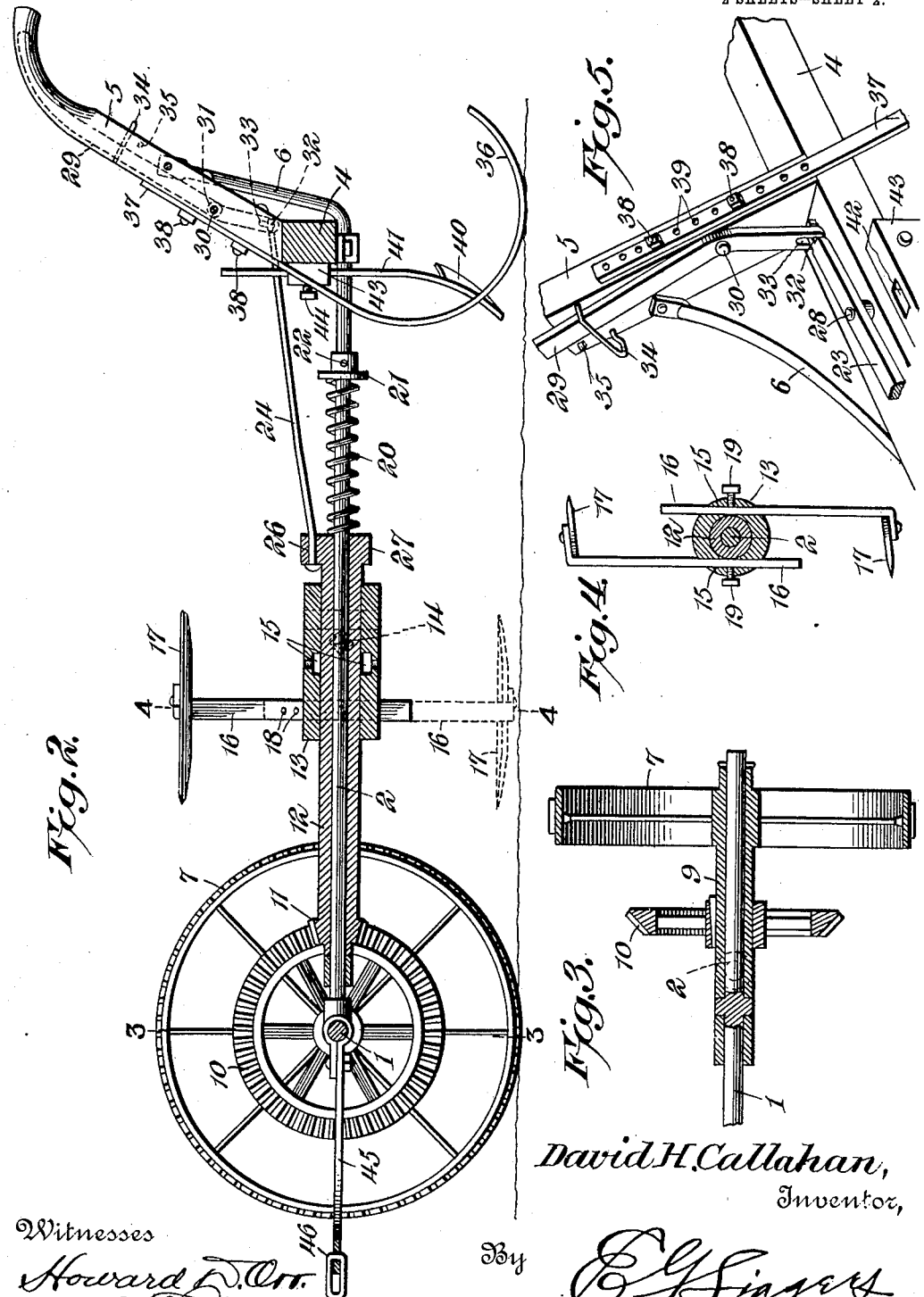

DAVID HARRISS CALLAHAN, OF WESTBROOK, NORTH CAROLINA, ASSIGNOR OF ONE-THIRD TO GASTON C. LEWIS AND ONE-THIRD TO SIMON A. LEWIS, OF KELLY, NORTH CAROLINA.

COTTON-CHOPPER.

No. 913,468.   Specification of Letters Patent.   Patented Feb. 23, 1909.

Application filed March 14, 1908. Serial No. 421,165.

*To all whom it may concern:*

Be it known that I, DAVID HARRISS CALLAHAN, a citizen of the United States, residing at Westbrook, in the county of Bladen and State of North Carolina, have invented a new and useful Cotton-Chopper, of which the following is a specification.

The invention relates to improvements in cotton choppers.

The object of the present invention is to improve the construction of cotton choppers, and to provide a simple and comparatively inexpensive one, capable of effectively blocking out and thinning cotton plants, and adapted also to cultivate the same by throwing the soil inward towards the plants.

A further object of the invention is to provide a cotton chopper of light construction, adapted to be readily handled by the driver, and having means for enabling the cotton chopping mechanism to be readily thrown out of operation without stopping the team.

Another object of the invention is to enable the cotton chopping blades or hoes, the cultivating blades and the frame of the machine to be adjusted vertically to obtain the desired sweep of the cotton chopping mechanism.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a cotton chopper, constructed in accordance with this invention. Fig. 2 is a longitudinal sectional view of the same. Fig. 3 is a transverse sectional view on the line 3—3 of Fig. 2. Fig. 4 is a similar view on the line 4—4 of Fig. 2. Fig. 5 is a detail perspective view, illustrating the arrangement of the operating lever and the means for adjusting the resilient runner.

Like numerals of reference designate corresponding parts in all the figures of the drawings.

The frame of the cotton chopper comprises a front axle 1, side rods 2 and 3, and a rear transverse connecting bar 4, to which an inclined handle 5 is centrally connected. Although a single handle is illustrated in the accompanying drawings, it will be apparent that a pair of handles may be used, if desired. The side rods are provided at their rear ends with upwardly and rearwardly inclined extensions, forming braces 6, which are secured at their upper ends to the inclined handle at opposite sides thereof. The front ends of the side rods are suitably connected to the front axle, which receives a traction wheel 7 and a carrying wheel 8.

The traction wheel is equipped at its inner side with a sleeve 9, on which is mounted a gear wheel 10, and the latter is rotated by the traction wheel when the cotton chopper is drawn forward. The gear wheel 10 meshes with a pinion 11, preferably formed integral with a hollow shaft or sleeve 12, which is slidably mounted on the side rod 2 to enable the pinion 11 to be moved into and out of mesh with the gear wheel 10. The sleeve carries a hub or collar 13, preferably secured to the sleeve 12 by a set screw 14 to enable it to be adjusted along the sleeve 12, and provided with a plurality of sets of slots or openings 15 for the reception of shanks 16 of cotton chopping blades or hoes 17. The shanks are provided at intervals with indentations 18, adapted to be engaged by set screws 19, whereby the said shanks are adjustably and detachably secured to the collar or hub 13. The shanks are slidable inwardly or outwardly to vary the sweep of the cotton chopping hoes or blades by moving the same toward and from the collar or hub 13, and the said blades or hoes are set at an angle to enable them to cut readily through the cotton plants without tearing the same. The blades or hoes make a clean cut, which is not affected by the forward movement of the cotton chopper. The different sets of slots or openings enable the shanks 16 to be arranged at different points along the collar, and they increase the range of adjustment afforded by the set screw 14.

The pinion 11 is held in mesh with the gear wheel 10 by a coiled spring 20, when the cotton chopping mechanism is in operation. The spring 20, which is disposed on the side rod 2, is interposed between the rear end of the sleeve and a stop 21, consisting of a sleeve having an annular enlargement or flange, arranged to receive the rear end of the coiled spring 20. The stop is secured to the rod 2 by a set screw 22 and is adjustable along the side rod 2 to vary the tension of the spring 20.

The rear end of the sleeve 12 is connected with a transverse lever 23 by a longitudinal rod 24, provided at its rear end with an eye 25, which is linked into a perforation of the outer end of the transverse lever 23. The front end of the rod 24 is secured in an eye 26 of a band 27, arranged on and suitably secured to the rear end of the sleeve 12. The transverse lever 23, which is disposed horizontally, is fulcrumed at an intermediate point on the rear transverse rod 24 by means of a bolt 28, and its inner arm is connected with the lower end of an inclined operating lever 29. The inclined operating lever 29, which is mounted on the handle 5, is fulcrumed at an intermediate point by means of a bolt 30, a spacing sleeve 31 being interposed between the lever and the handle. The inner end of the transverse lever is reduced to form a pivot 32, which is arranged in a slot 33 of the lower end of the operating lever. The pivot 32 is T-shaped, and its head is passed through the slot before the levers are mounted on the transverse bar 4 and the handle 5 and while the head is disposed longitudinally of the slot. When the parts are assembled, the head is disposed transversely of the slots, which afford sufficient play to permit the operating lever to oscillate the transverse lever for moving the pinion 11 out of and into mesh with the gear 10. The inner end of the transverse lever is detachably connected with the operating lever and the parts are readily assembled, but any other suitable means may be employed in pivotally connecting the levers.

The upper arm of the operating arm is arranged in a keeper 34, disposed transversely of the handle, which is also equipped with a beveled lug 35. The upper arm of the lever has sufficient rearward movement to enable the pulley to be withdrawn from the gear 10 without engaging the lever with the beveled lug, which, when the lever is given a further rearward movement, is adapted to engage the lever and lock the pinion 11 out of mesh with the gear 10. By means of the operating mechanism, the driver may instantly throw the chopping mechanism out of operation without stopping the team, but when the cotton chopper is to be transferred from one field or point to another, the cotton chopping mechanism is locked out of operation by engaging the lever with the lug.

The rear portion of the frame is yieldably supported by a resilient runner, arranged centrally of the rear end of the frame and consisting of a spring, having a curved lower portion 36 and an inclined upper portion 37, secured to the front face of the inclined handle 5 by bolts 38. The inclined portion of the runner is provided at intervals with perforations 39 to enable the frame to be adjusted vertically to correspond with the adjustments of the cotton chopping hoes or blades and a pair of cultivating blades 40.

The axle at the front of the frame forms a pivot for the latter in the up and down oscillatory movement incident to the employment of a resilient runner. The central arrangement of the handle between the side bars of the frame enables the horse and the operator to walk between the rows of plants, which is advantageous in both the operation of the machine and in guiding and controlling the draft animal.

The cultivating blades are spaced apart to arrange them at opposite sides of the row of plants operated on by the cotton chopping mechanism, and they are tapered and set at an angle for throwing the soil inwardly towards the plants.

Any preferred form of cultivator blade may be employed, and the blades are preferably equipped with vertical shanks 41, adjustably secured in slots 42 of a supporting bar 43 by means of set screws 44. The shanks are provided at intervals with perforations, and the screws extend through the same, but indentations similar to the shanks 16 of the hoes or blades 17 may be provided. The supporting bar 43 is secured by bolts, or other suitable fastening devices to the front face of the rear transverse bar 4 at one end thereof. The set screws enable the cultivator blades to be raised and lowered to correspond with the adjustments of the blades or hoes and the frame of the machine.

The cotton chopper is provided at its front with a draft attachment 45 for the attachment of one or more animals. The draft attachment is composed of two sides secured at their rear ends to the front axle. The draft attachment is provided at its front with a link 46, which is adapted to receive the hook or link of a whiffletree.

The cotton chopper may be equipped with a pair of shafts instead of the draft attachment 45, if desired.

Having thus fully described my invention, what I claim as new and desire to secure by Letters Patent, is:—

1. In a cotton chopper, the combination of a frame including side rods and a front axle connecting the side rods and forming a pivot for the frame, a handle located at the back of the frame, a traction wheel mounted on the axle, a gear connected with the traction wheel, a sleeve slidable on one of the side rods and having a pinion meshing with the gear, and a blade or hoe carried by the sleeve.

2. In a cotton chopper, the combination of a frame including side rods and a front axle connecting the side rods and forming a pivot for the frame, a handle connected with the back of the frame, a traction wheel mounted on the axle, a gear connected with the traction wheel, a sleeve slidable on one of the side rods and having a pinion meshing with the gear, a blade or hoe carried by the sleeve, a spring for holding the pinion in mesh with the gear, and operating mechanism connected with the sleeve for moving the pinion out of mesh with the gear.

3. In a cotton chopper, the combination of a frame including a rod, a sleeve mounted on the rod, a collar adjustably secured to the sleeve and provided with openings, hoes or blades having shanks adjustably secured in the openings, and gearing for rotating the sleeve.

4. In a cotton chopper, the combination of a frame including a rod, a sleeve mounted on the rod, a collar adjustably mounted on the sleeve and provided with a plurality of sets of slots or openings, hoes or blades having shanks to fit in the said slots or openings, means for adjustably securing the shanks in the slots or openings, and gearing for rotating the sleeve.

5. In a cotton chopper, the combination of a frame including side rods, a handle mounted on the frame at the rear portion thereof and at a point between the side rods, a sleeve slidably arranged on one of the side rods and off-set laterally from the plane of the handle, gears for rotating the sleeve, one of the gears being carried by the said sleeve, a coiled spring engaging the sleeve and disposed on the adjacent side rod, an operating lever located adjacent to the said handle, and means for connecting the operating lever with the sleeve for moving the gears into and out of mesh.

6. In a cotton chopper, the combination of a frame including side rods and a transverse connecting bar, a handle connected with the rear portion of the frame at a point between the side rods, a sleeve slidable on one of the side rods, gears for rotating the sleeve, one of the gears being carried by the latter, an operating lever fulcrumed on the handle, a transverse lever mounted on the connecting bar, and means for connecting the transverse lever with the sleeve.

7. In a cotton chopper, the combination with a frame including side rods, and a transverse connecting bar, a handle secured to the transverse connecting bar at a point between the side rods, a sleeve slidable on one of the side rods and located to one side of the plane of the handle, gears for rotating the sleeve, one of the gears being carried by the latter, an operating lever, a transverse lever mounted on the connecting bar and extending laterally from and connected with the operating lever, means for connecting the transverse lever with the sleeve, a keeper mounted on the handle and receiving the operating lever, and a beveled lug arranged in the path of the operating lever for locking the same to hold the gears in mesh.

8. In a cotton chopper, the combination of a frame including side rods, a rear transverse connecting bar, and a front axle forming a pivot for the frame, a sleeve slidably arranged on one of the side rods, a traction wheel mounted on the axle, a gear connected with the traction wheel, a pinion carried by the sleeve and meshing with the gear, blades or hoes mounted on the sleeve, a handle secured to the frame at the rear end thereof and located at a point between the side rods, an operating lever fulcrumed on the handle, and a transverse lever mounted on the rear connecting bar and connected with the sleeve and with the operating lever.

9. In a cotton chopper, the combination of a frame including side rods, and a rear connecting bar, rotary cotton chopping blades or hoes supported by one of the side rods and adjustable radially to vary their length, means for actuating the blades or hoes, spaced cultivating blades located in rear of the cotton chopping blades or hoes and arranged at opposite sides of the rod on which the said blades or hoes are mounted, and means for raising and lowering the cultivating blades to adjust the same to correspond with the adjustment of the blades or hoes.

10. In a cotton chopper, the combination of a frame, adjustable cotton chopping mechanism, a supporting bar located in rear of the cotton chopping mechanism and provided with slots or openings, spaced cultivating blades provided with shanks adjustable in the slots or openings of the supporting bar to correspond with the adjustment of the cotton chopping mechanism, and means for securing the said shanks in their adjustment.

11. In a cotton chopper, the combination of a frame including side rods, cotton chopping mechanism mounted on one of the side rods, an inclined handle extending upwardly from the rear end of the frame at a point between the side rods, and a resilient runner consisting of a spring having a lower curved portion and an inclined upper portion adjustably secured to the handle.

12. In a cotton chopper, the combination of a frame including a supporting rod, a slidable sleeve mounted on the supporting rod, gearing for operating the sleeve and moved out of mesh by the sliding of the same, a transverse lever fulcrumed at an intermediate point and provided at one end with a T-shaped pivot, an operating lever having a slot detachably receiving the T-shaped pivot, means for connecting the transverse lever with the sleeve, and chopping mechanism carried by the sleeve.

In testimony, that I claim the foregoing as my own, I have hereto affixed my signature in the presence of two witnesses.

DAVID HARRISS CALLAHAN.

Witnesses:
A. J. EDWARDS,
JOE E. CROMARTIE.